June 29, 1965 H. W. MOORE 3,191,282

DEVICE FOR INSERTING WEDGES IN COIL SLOTS

Filed Sept. 8, 1961 7 Sheets-Sheet 1

INVENTOR.
HARRY W. MOORE
BY Dybvig and Dybvig
HIS ATTORNEYS

June 29, 1965 H. W. MOORE 3,191,282

DEVICE FOR INSERTING WEDGES IN COIL SLOTS

Filed Sept. 8, 1961 7 Sheets-Sheet 2

INVENTOR.
HARRY W. MOORE
BY
HIS ATTORNEYS

June 29, 1965 H. W. MOORE 3,191,282

DEVICE FOR INSERTING WEDGES IN COIL SLOTS

Filed Sept. 8, 1961 7 Sheets-Sheet 3

INVENTOR.
HARRY W. MOORE
BY Dybvig and Dybvig
HIS ATTORNEYS

INVENTOR.
HARRY W. MOORE
BY Dybvig and Dybvig
HIS ATTORNEYS

June 29, 1965 H. W. MOORE 3,191,282

DEVICE FOR INSERTING WEDGES IN COIL SLOTS

Filed Sept. 8, 1961 7 Sheets-Sheet 5

INVENTOR.
HARRY W. MOORE
BY [signature]
HIS ATTORNEYS

INVENTOR.
HARRY W. MOORE
BY Dybvig and Dybvig
HIS ATTORNEYS

DEVICE FOR INSERTING WEDGES IN COIL SLOTS

Filed Sept. 8, 1961 7 Sheets-Sheet 7

INVENTOR.
HARRY W. MOORE
BY Dybvig and Dybvig
HIS ATTORNEYS 3,191,282
Patented June 29, 1965

3,191,282

DEVICE FOR INSERTING WEDGES IN COIL SLOTS

Harry W. Moore, 5051 Kittridge Road, Dayton, Ohio

Filed Sept. 8, 1961, Ser. No. 136,947
9 Claims. (Cl. 29—205)

This invention relates to an apparatus for inserting wedges into coil slots of a field member and more particularly to an apparatus for adjusting the position of coils in the coil slots of the field member to provide clearance for movement of insulating strips into the coil slots. However, the invention is not necessarily so limited.

In constructing rotor and stator field members for electric motors, generators and the like, it is conventional practice to insert coils of wires into slots in the field member. For satisfactory operation of the field member, it is important that the coils supplied be insulated from the field member. The present invention is concerned with methods for inserting insulating strips into the slots of the field members after coils have been located in the slots.

An object of the present invention is to provide new and improved apparatus for inserting insulating strips of wedges into the slots of field members after coils have been located in such slots.

Still another object of the present invention is to provide an improved apparatus for inserting insulating wedges into a field member, which apparatus includes means to adjust the position of coils already deposited in the field member so as to provide clearance for movement of insulating wedges into slots of the field member.

Other objects and advantages reside in the construction of parts, the combination thereof, the method of manufacture and the mode of operation, as will become more apparent from the following description.

The present apparatus can be subdivided into two operating mechanisms which are driven from a common drive mechanism and therefore operate in synchronism, but which are otherwise generally independent. The first of these mechanisms comprises means to prepare insulating wedges for insertion into a field member and means to project the wedges into the field member. Hereafter, this mechanism will be designated generally as a wedge supply means. The other mechanism comprises means to support a field member for receipt of wedges and means to adjust the position of coils in the field member to provide a clearance for movement of wedges into the field member.

*Wedge supply means*

Figure 1:
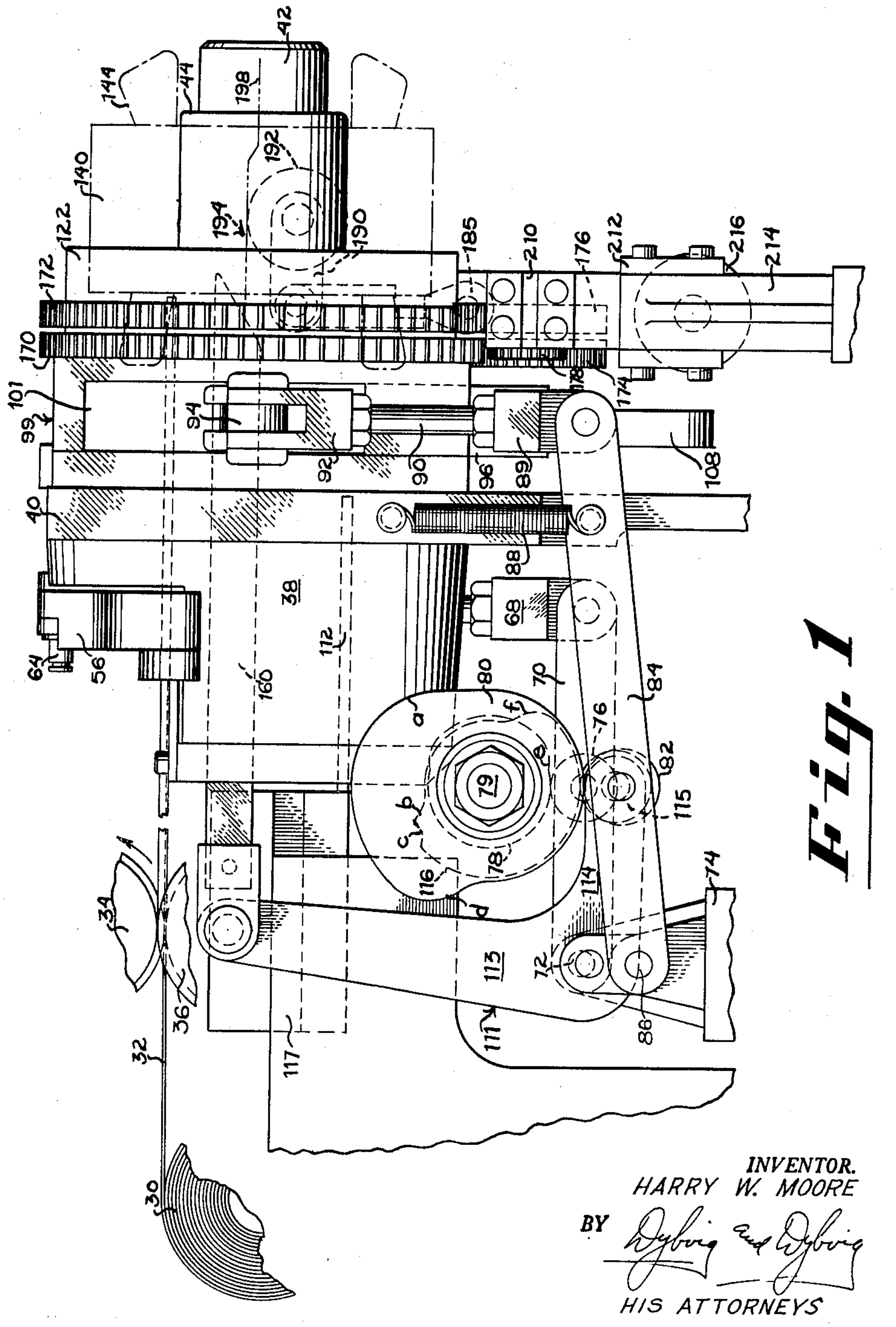
FIGURE 1 is a side elevational view of the apparatus of the present invention with parts broken away and other parts shown in phantom detail.

Referring to FIGURE 1, electrically insulating strip material 32 is supplied to the apparatus of the present invention from a supply roll 30. The strip material is advanced into the apparatus by means of driving rollers 34 and 36 which cooperate to form the initially flat strip material into a desired cross sectional shape. As one example, the rollers 34 and 36 may form the strip material into a channel shape. A driving mechanism, not shown, advances the driving rollers 34 and 36 through intermittent rotational increments such that the formed strip material 32 is advanced into the apparatus in equal cyclic increments. While only one supply roll 30 and associated driving rollers 34 and 36 are visible in FIGURE 1, two supply rolls and associated drive rollers located side by side are employed in the present apparatus to supply two strips simultaneously.

Figure 3:
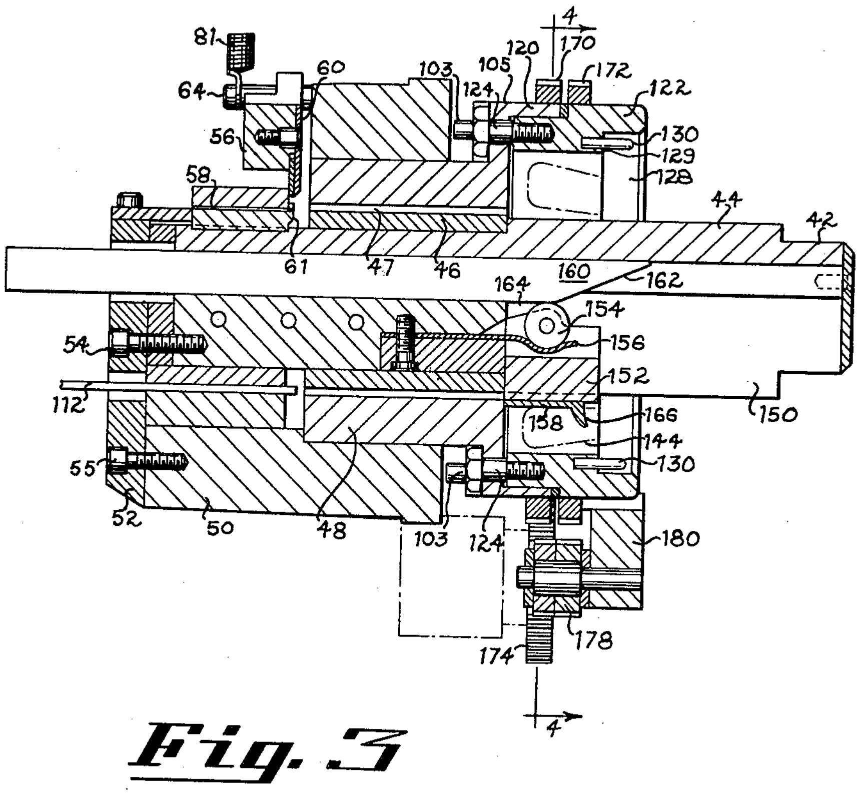
FIGURE 3 is a fragmentary sectional view taken substantially along the line 3—3 of FIGURE 2.
Figures 4, 5, 7:
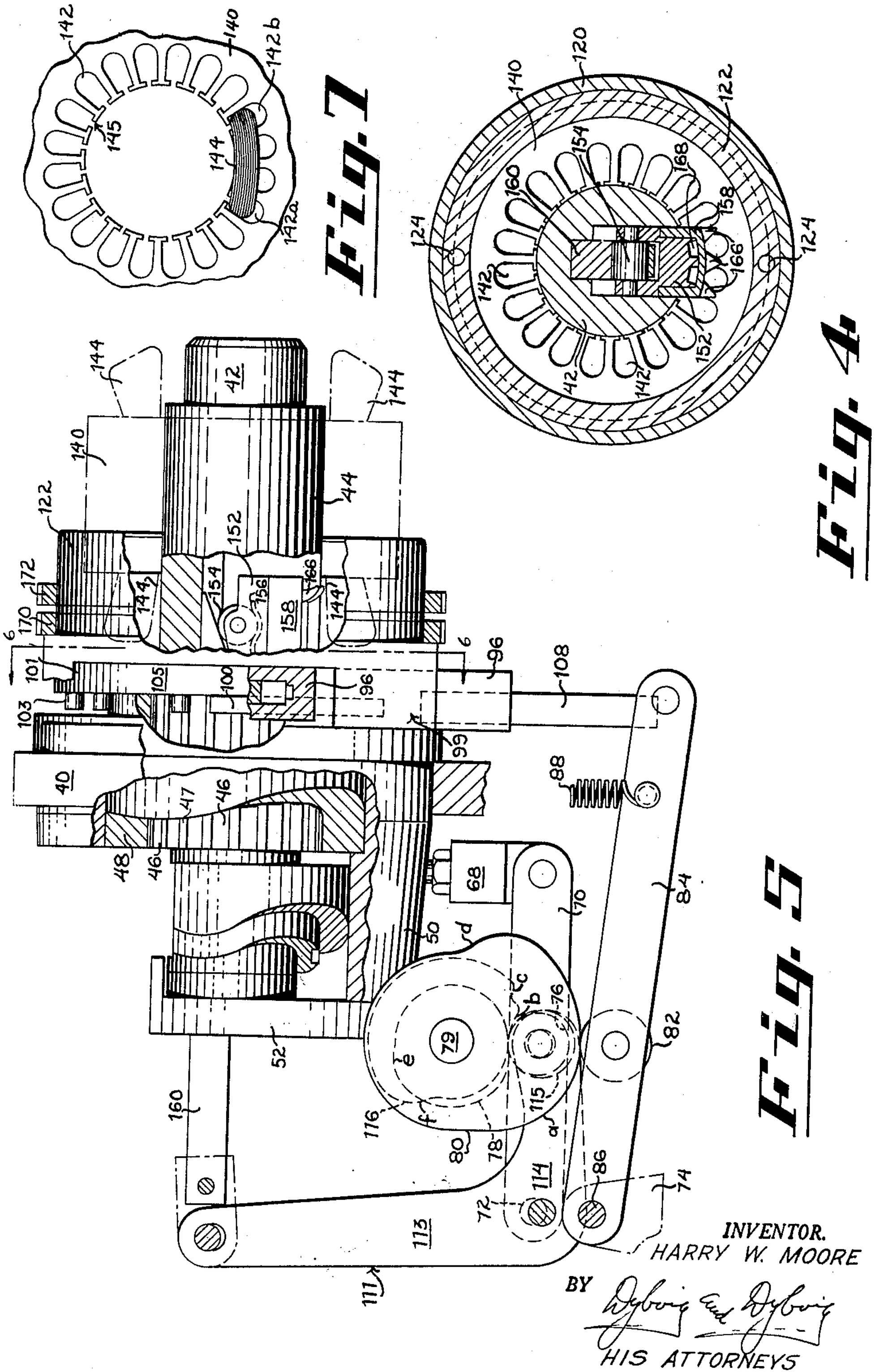
FIGURE 4 is a fragmentary sectional view taken substantially along the line 4—4 of FIGURE 3.
FIGURE 5 is a fragmentary side elevational view of the apparatus of FIGURE 1 with portions broken away to reveal the interior construction of the apparatus.
FIGURE 7 is a fragmentary plan view of a field member amendable to processing with the present method and apparatus illustrating a single coil deposited in slots of the field member.

The formed insulating strips 32 pass from the driving rollers 34 and 36 into a supply magazine illustrated generally at 38. This magazine is supported by a stationary upright frame member 40. The interior construction of this supply magazine is best illustrated in FIGURE 3. There, it will be observed that the supply magazine is assembled upon a cylindrical core 42 having an enlarged section 44 thereon. Located immediately to the left of this enlarged section, as viewed in FIGURE 3, is a cylindrical sleeve 46 journalled for rotation on the core 42. As best seen in FIGURE 5, this sleeve 46 has a plurality of axially extending slots 47 therein, these slots being adapted to receive insulating strip material from the driving rolls 34 and 36. Press-fitted on the sleeve 46 is a cover member 48. The interior wall of the cover member cooperates with the slots in the sleeve 46 to form generally rectangular passages into which the insulating strip material is inserted. The cover member 48 is mounted for rotation in a casing 50 and, with the sleeve 46, forms a rotating magazine. This casing 50 and the core 42 are interconnected by means of an end plate 52 bolted to the core 42 with a bolt 54 and to the casing 50 with a bolt 55. While only one each of the bolts 54 and 55 is visible, it will be understood that several such bolts may be employed. The casing 50 is fixedly supported in the frame member 40, and accordingly, neither the casing 50 nor the inner core 42 is free to rotate.

Fixedly mounted upon the inner core 42 is a bracket member 56 (best seen in FIGURES 1 and 3). Located internally of this bracket are passages 58 which guide the insulating strips from the driving rollers 34 and 36 into the magazine slots 47.

A knife 60 is pivotally mounted on the bracket 56. The construction and operation of this knife is best observed in FIGURE 2 where the knife appears in broken line detail. There, it will be observed that the knife 60 is pivoted at one end on a pivot 62 associated with the bracket 56. A pivot pin 64 at the opposite end connects the knife to a generally vertical actuator rod 66 provided with a coupler 68 at the lower end thereof. Referring to FIGURE 1, it can be observed that the coupler 68 connects pivotally to one end of a link 70. The opposite end of this link is pivotally joined at 72 to a fixed support 74. A cam follower wheel 76 is mounted on the link 70 intermediate its ends and follows the periphery of a cam 78 fixedly attached to a cam shaft 79 which will be described in greater detail subsequently. For the present, it suffices to note that the cam shaft 79 rotates one complete revolution for each cycle of operation of the present apparatus and, during each cycle of operation, the driving rolls 34 and 36 function to advance one increment of strip material from each supply roll 30 into the supply magazine. The orientation of the cam 78 on the cam shaft 79 is such that, for each cycle of operation, the knife 60 is actuated downwardly as viewed in FIGURE 2 one time, the knife being timed to move downwardly after the drive rollers 34 and 36 have advanced strip material into the magazine slots 47. With continued rotation of the cam 78, after the knife is actuated downwardly, a return spring 81, illustrated in FIGURE 3, returns the knife to its upper position.

In its downward movement, the knife 60 passes a flat surface 61 formed on the bracket 56 and cooperates with this flat surface to cut the strip material advanced into the supply magazine, two strips of insulating material being cut simultaneously.

Figure 6:
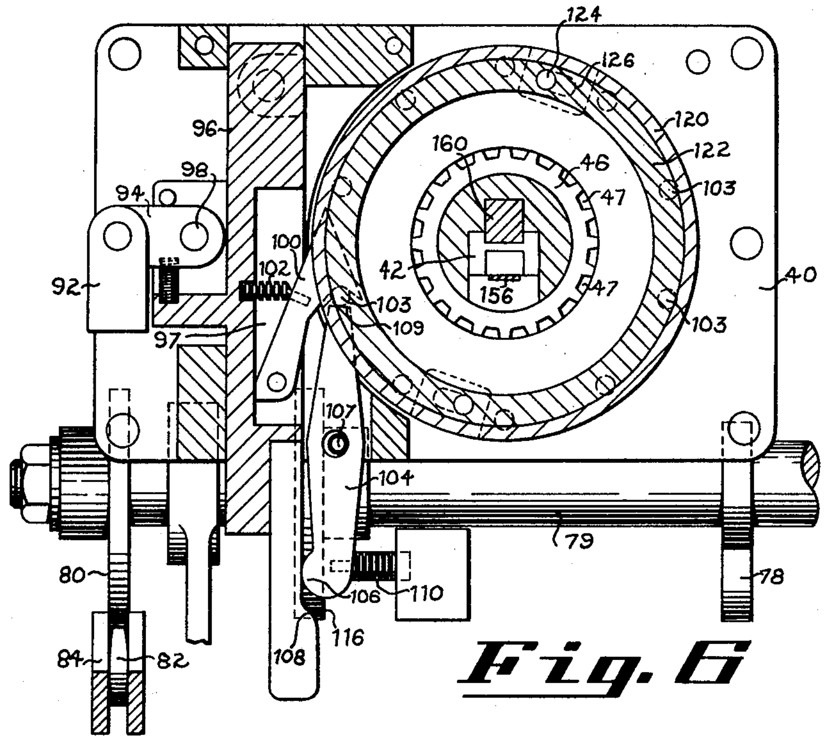
FIGURE 6 is a cross sectional view taken substantially along the line 6—6 of FIGURE 5.

FIGURE 1 illustrates a second cam 80 located on the cam shaft 79. This cam 80 operates a mechanism which is employed to rotate the supply magazine in a stepwise manner so as to advance the insulating strip deposited in the supply magazine in a stepwise manner to new locations. Associated with the cam 80 is a cam follower 82 mounted on a link 84, which link is pivoted at one end at 86 to the stationary support 74. Engaging the link 84 is a spring 88 which biases the follower against cam 80 at all times. The opposite end of the link 84 pivotally engages a coupler 89 attached to a vertically extending actuator rod 90 which terminates at its upper end with a coupler 92. As best illustrated in FIGURE 6, the coupler 92 engages a link 94 connected through a shaft 98 to a vertically movable slide 96. Pivotally mounted within a slot 97 in the slide is a pawl 100. This pawl is biased outwardly of the slide with a spring 102. The pawl is adapted to engage studs 103 which project rearwardly from an annular flange 105 integral with the cover member 48 associated with the supply magazine.

As best illustrated in FIGURE 1, the slide 96 and pawl mechanism are ordinarily enclosed by a protective shield 99 provided with a window 101 through which the link 94 extends. This shield, which is mounted adjacent the frame member 40 has been removed as needed, in various other figures to illustrate the interior detail.

The arrangement of the pawl 100 on the slide 96 is such that, with upward movement of the actuator rod 90 as permitted by the cam 80, the pawl 100 moves upwardly, first camming past a stud 103 and then overlying that stud. After completion of this upward travel, a continued rotation of the cam 80 forces the slide 96 downwardly causing the pawl 100 to rotate the supply magazine through a predetermined rotational increment. Overtravel of the supply magazine is prevented by means of a stop element 104, illustrated in FIGURE 6. This stop element is pivotally mounted at 107 and is provided with a cam follower portion 106 at the lower end thereof. The portion 106 follows a cam 108 carried by the slide 96. As the slide 96 moves upwardly, the cam 108 forces the stop element 104 to pivot in a counterclockwise direction to a position where it cannot interfere with rotation of the supply magazine. As the slide 96 moves downwardly, a spring 110 returns the stop element 104 in a clockwise direction so as to position the upper end 109 of the stop element in the path of the stud 103 which has just been engaged by the pawl 100. This causes the stud 103 to be positively located between the pawl 100 and the stop element 104.

In FIGURE 6, it can be seen that ten studs 103 are located at equal angular positions on the supply magazine. Accordingly, the supply magazine is rotated substantially 36° with each cycle of operation. Also, in FIGURE 6, it can be noted that there are twenty receiving slots 47 for the strip material, which slots are spaced at equal angular positions. Accordingly, the slots are spaced at 18° intervals and each 36° rotation of the supply magazine causes the two receiving slots 47, which have just received new strip material, to rotate out of the receiving position while two new receiving slots rotate into the receiving position. With successive cycles of operation, the receiving slots in the supply magazine are rotated substantially 180° whereupon the insulating strips carried in the slots are in position to be projected into a field member.

The means for projecting the insulating strips from the supply magazine into the field member comprises a pair of spikes 112, the two spikes being located side by side and moving in unison to simultaneously drive two insulating strips out of the supply magazine. One of these spikes is illustrated in each of FIGURES 1 and 3. The mechanism by which these spikes are actuated at the proper time in the operating cycle will be described subsequently.

The foregoing description relates to a wedge supply means to which no claim of novelty is made in the present application. This wedge supply means is a preferred type for use in association with the present invention; however, it is to be understood that other and different types of wedge supply means can also be employed in the present invention. In the following, means for supporting a field member to receive wedges from the supply member and means to establish a clearance in the field member for movement of the wedges will be described.

*Field member support*

FIGURES 4 and 7 illustrate a field member 140 of the type which is amenable to processing in the present invention. This field member comprises a cylindrical body provided with equispaced, internally directed, axially extending slots 142. FIGURE 7 illustrates one coil 144 deposited in slots 142*a* and 142*b* of the field member, the coil spanning four slots of the field member. The manner of depositing the coils 144 in the field member forms no part of this invention. It is to be understood, of course, that numerous coils, such as the coil 144, are deposited in each field member, the coil in various slots 142 overlapping one another.

Prior to deposition of the coils in the field member 140, it is conventional practice to line the lower portion of each slot 142 with an insulating wedge, not shown. The various techniques by which this insulating liner may be placed in the field member form no part of the present invention. Rather, the present invention is concerned with techniques for placing insulating wedges across the open portions 145 in the slots after the field member has been provided with its full complement of coils 144.

Insertion of this final insulating wedge at the opening to each coil receiving slot has proved particularly troublesome in the past for the reason that the coils deposited in the slots interfere with movement of the insulating wedges over the coils. Such difficulties have been eliminated in the present invention by providing a means to depress the coils in the slots and so align the coils that the wedge moves freely over the coils into the slot.

For supporting the field member in proper position adjacent the wedge supply means, a generally cylindrical support member 122 is secured against the forward wall of the cover member 48 inside a peripheral flange 120 with suitable bolts 124, as illustrated in FIGURE 3. As best observed in FIGURE 6, the bolts 124 pass through slots 126 formed in the annular flange 105 integral with the cover member 48. The slots 126 permit limited rotational movement of the support member 122 relative to the wedge supply means.

Disposed concentrically in the support member 122 is a cylindrical recess 128 adapted to receive the field member. A plurality of pins 130 secured in a shoulder 129 in the recess 128 are adapted to engage complementary apertures in the field member so as to key the field member nonrotatably in the recess 128.

FIGURE 5 illustrates, in phantom detail, a field member 140 seated in the field member support 122. There, it will be noted that the field member 140 is journalled on the enlarged section 44 of the core member 42 associated with the wedge supply means. There, it will also be noted that the coils 144 carried by the field member project from one side of the field member into the recess 128 of the support member 122, coils 144 having been illustrated in phantom detail.

The mechanism for depressing the coils into their respective slots 142 is best observed in FIGURES 3 and 4. This mechanism includes a cam follower member 152 mounted for sliding movement in a slot 150 formed in the central core 42 of the wedge supply means. Supported on the member 152 is a cam follower wheel 154 which is biased upwardly by a spring member 156 mounted fixedly in the central core. The upward bias of the spring member 156 causes the cam follower wheel 154 to engage a ram-type cam 160.

This cam 160 is oscillated along a horizontal axis by means of a bell crank 111 pivoted on the fixed support 74. This bell crank has two angularly disposed arms 113 and 114. The arm 113 projects upwardly from the fixed support to engage the cam 160. The arm 114 supports a cam follower wheel 115 which follows the periphery of a cam 116 mounted on the cam shaft 79. Suitable spring means, not shown, bias the cam follower 115 against the periphery of the cam 116.

With rotation of the cam shaft 79, the cam 160 is reciprocated along a substantially horizontal axis. When the cam moves to the left as viewed in FIGURE 3, the cam follower 154 rides up an inclined cam surface 162 causing the cam follower member 152 to move upwardly. Conversely, when the cam 160 is moved to the right as viewed in FIGURE 3, the cam follower wheel 154 moves down the inclined surface 162 to engage a horizontal surface 164 under the cam. Thus, the cam follower member 152 has an upward and downward movement which is regulated by the cam 160.

Fitted on the lower end of the cam follower member 152 is a generally U-shaped member 158, the sides of member 158 being substantially flush with the sides of member 152, as illustrated in FIGURE 4. Extending downwardly from member 158 are three spaced finger portions 166 forming two recesses between the finger portions, the spacing between the finger portions corresponding generally to the width of the slots 142 in the field member 140. As best illustrated in FIGURE 5, these finger portions 166 are located adjacent one side of the field member 140 (shown in phantom detail) such that downward movement of the cam follower member 152 will cause each recess to engage an underlying coil 144 in the field member 140 with the result that downward movement of the cam follower member 152 in response to movement of the cam 160 will depress the coils 144 downwardly in the corresponding slots 142 of the field member. In so doing, the cam follower member 152 provides clearance for movement of insulating strips into the cleared slots of the field member.

As can be best seen in FIGURE 4, the cam follower member 152 has spaced channels 168 formed in the lower surface thereof, these channels providing passages for the movement of insulating strips from the supply magazine into the slots of the field member. Two channels 168 are provided so that two insulating strips may be moved simultaneously from the supply magazine into slots of the field member. The construction and arrangement of the channels 168 is such that these channels will be aligned with the supply magazine to receive strips from the supply magazine when the cam follower member 152 has been depressed downwardly to a position where the cam follower wheel 154 engages the horizontal surface 164 on the cam 160. Thus, the channels 168 are aligned for receipt of insulating strips only when the finger portions 166 have been depressed sufficiently to provide a clearance for movement of the insulating strips into the slots 142 of the field member 140.

As is evident in FIGURE 7, the coils 144 are in the form of loops which pass through spaced slots 142 in the field member. Since these coils are in the form of loops, the coils do not follow a straight line course as they move out of the slots 142. Rather, the coils in leaving one slot turn in the direction of another slot, following a curved course. Due to this curvature in the coils as they move into and out of the slots 142, there is a risk that the fingers 166 will not straddle the coils and properly align them as they are depressed into engagement with the coils. The following mechanism is employed to align the coils with the entering wedge.

Figure 2:
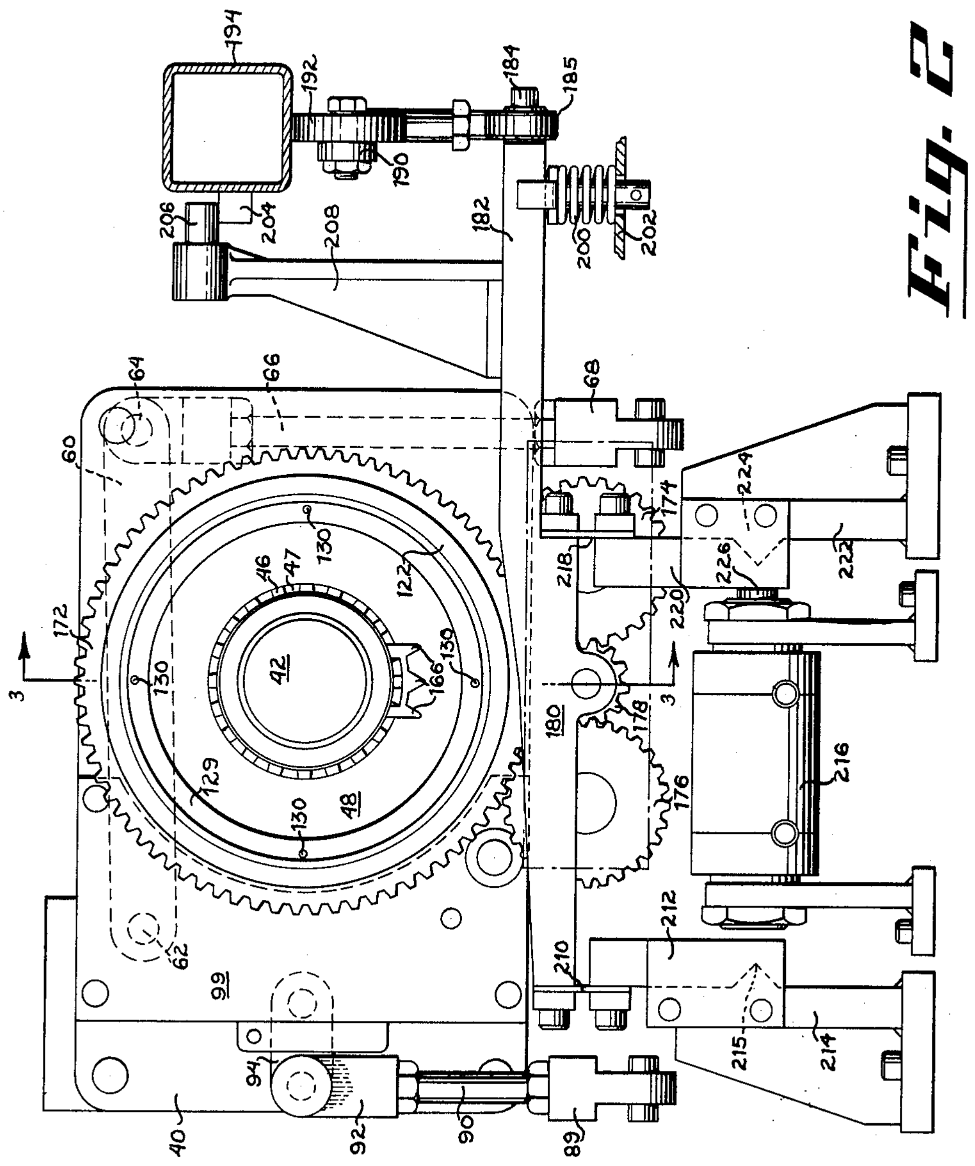
FIGURE 2 is an end elevational view of the device disclosed in FIGURE 1 with portions shown in section.

Encircling the peripheral flange 120, which is integral with the cover member 48 of the supply magazine, is a ring gear 170. A similar ring gear 172 encircles the field member support 122. These ring gears are engaged by pinions 174 and 176, respectively, as illustrated in FIGURE 2. A drive gear 178 meshes with both of the pinions 174 and 176.

The drive gear 178 is supported by a generally horizontal arm 180 provided with an extension 182 at the right end thereof as viewed in FIGURE 2. The extension 182 terminates in a pin 184 seated within the eye of an eye bolt 185. The upper end of the eye bolt 185 engages a bell crank member 190 supporting a cam follower roller 192. This cam follower roller engages the under surface of a ram-like cam member 194, illustrated fragmentarily in phantom detail in FIGURE 1, and more fully illustrated in FIGURES 2 and 8. The under surface of the cam 194 is provided with a protuberance 198 which is lower in elevation than the remaining under surface of the cam 194. This protuberance appears in phantom detail in FIGURE 1. A compression spring 200 engaging a fixed support 202 urges the extension 182 upwardly so as to bias the cam follower roller 192 against the under surface of the cam 194.

For reasons which will become apparent subsequently, it is important that the extension 182 have an accurately located center position. For locating the center position, a cam 204 located to one side of the ram-like cam 194 engages a roller 206 fixedly supported on a pedestal 208. The cam 204 cooperating with the roller 206 fixes the elevation of the ram-like cam 194, the compression spring 200 functioning through the medium of the eye bolt 185 to bias the cam 204 against the roller 206. The cam 204 extends horizontally throughout the operative length of the ram-like cam 194 and accordingly fixes the elevation of the cam 194 at all operative positions.

At its extreme left end, as viewed in FIGURE 2, the arm 180 which supports the drive gear 178 is secured to a flexible hinge 210 mounted on a latch member 212. This latch member 212 is adapted to slide vertically on a fixedly mounted frame member 214 provided with a detent 215 adapted to interengage a complementary recess in the latch member 212. A bi-directional pneumatic actuator 216 is fixedly supported adjacent the latch member 212 such that a piston 226 in the actuator 216 may be forced against the latch member 212 so as to cause this member to firmly engage the detent 215 thereby locking the latch member 212 and the arm 180 against vertical movement. Deenergizaiton of the actuator 216 frees the latch member 212 for vertical movement.

A second flexible hinge 218 engages the arm 180 adjacent the extension 182. This hinge 218 is mounted upon a latch member 220 similar to the latch member 212 which slides vertically on a fixedly mounted frame member 222, similar to the frame member 214. This frame member 222 is provided with a detent 224 adapted to seat in a complementary recess in the latch member 220. The actuator 216, being bi-directional, can selectively engage either the latch member 212 or the latch member 220 with its piston 226.

When the piston 226 engages the latch member 220, as shown, the latch member 212 is disengaged and accordingly the arm 180 is free to pivot about the flexible hinge 218. When the piston 226 is actuated in the opposite direction so as to engage the latch member 212, the arm 180 becomes free to pivot about the flexible hinge 210.

Assuming that the piston 226 engages the latch member 220, as shown, movement of the ram-like cam 194 to the left as viewed in FIGURE 1 will cause the cam follower roller 192 to engage the protuberance 198 of the cam 194. This will cause the cam follower roller 192 to move downwardly, whereby the extension 182 of the arm 180 is depressed downwardly in opposition to the spring 200. The downward movement of the extension 182 causes the drive gear 178 to move downwardly. As will become clear subsequently, the ring gear 170 is held stationary by the pawl 100 at this time and accordingly the pinion 174 cannot rotate. The pinion 176 must therefore rotate in a clockwise direction as the drive gear moves downwardly. As a result, the ring gear 172 moves in a counterclockwise direction. Accordingly, the field member support 122 and the field member mounted therein are caused to rotate in a counterclockwise direction as viewed in FIGURE 2, this rotation being a small increment as determined by the difference in elevation between the under surface of the cam 194 and the protuberance 198. The slots 126 associated with the bolts 124 permit this rotary shift.

If, on the other hand, the actuator 216 had been energized so that the piston 226 engaged the latch member 212, downward movement of the extension 182 would have caused the drive gear 178 to move upwardly thereby causing the pinion 176 to rotate in a counterclockwise direction and the ring gear 172 to rotate in a clockwise direction. In this case, the result would be that the field member support 122 and the field member mounted therein would be rotated in a clockwise direction as viewed in FIGURE 2 through a small increment of rotation determined by the difference in elevation between the cam 194 and the protuberance 198.

Considering that the under surface of the cam 194 establishes a center position for the drive gear 178 and a corresponding center position for the field member support 122, it is apparent that movement of the cam 194 to the left as viewed in FIGURE 1 will produce either a clockwise or a counterclockwise rotation of the field member support away from the center position depending on the direction in which the actuator 216 has been energized. This selective clockwise or counterclockwise rotation of the field member support 122 results in a clockwise or counterclockwise rotation of the field member relative to the finger portions 166 which are used to engage and depress the coils in the field member.

Referring to FIGURE 7, it will be noted that the coil 144, emerging from slot 142*a*, curves in the direction of the slot 142*a*. Assuming that fingers 166 are to engage the coil 144 as it emerges from the slot 142*a*, a clockwise shift of the field member 140 will be required to align the fingers 166 so that they properly straddle the coil 144. Similarly, when fingers 166 are to engage the coil 144 as it emerges from the slot 142*b*, a counterclockwise shift of the field member 140 will be required to align the fingers 166 properly with the coil 144. Once the appropriate shift in the position of the field member has been made, the fingers 166 can be depressed downwardly by the cam 160 to engage the coil.

After the described rotational shift which occurs between the field member 140 and the wedge supply means, the slots 142 in the field member are no longer properly aligned to receive insulating strips from the wedge supply means. It is therefore necessary to return the field member support 122 to its center position before projecting insulating strips from the supply magazine toward the field member. This is accomplished by returning the cam 194 to the right, as viewed in FIGURE 1, after the fingers 166 have been depressed downwardly and before insulating strips are driven out of the supply magazine. By effecting this return to a center position at a time when the fingers 166 are depressed downwardly at least partially, the curved portions of the coils emerging from the slots 142 are carried by the finger portions into an exact alignment with the slots. This provides a clear straight line passage for movement of the insulating strips into the slots 142.

Figure 8:
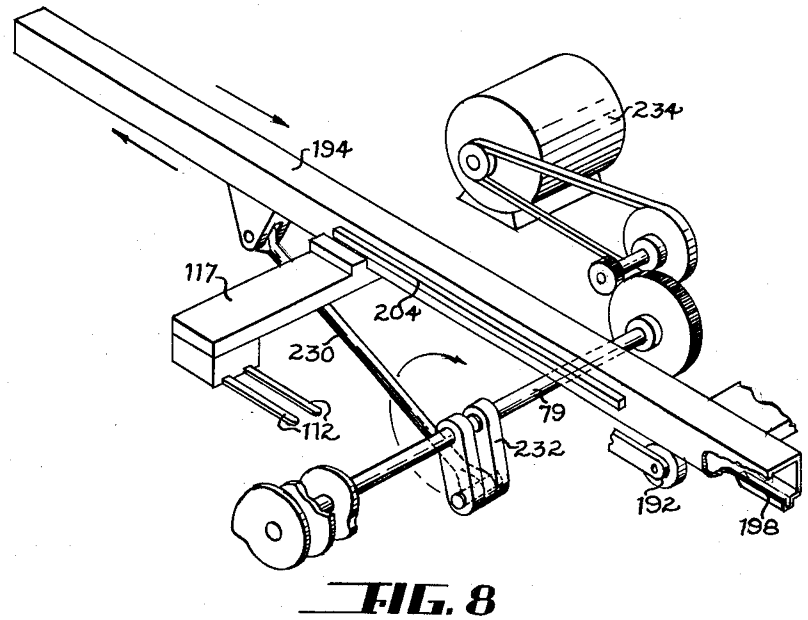
FIGURE 8 is a perspective view with portions broken away illustrating the main driving mechanism employed in the present apparatus.

As illustrated in FIGURE 8, the ram-like cam 194 is reciprocated along a horizontal axis by means of a connecting rod 230 eccentrically connected to the cam shaft 79 by an arm 232, the shaft 79 being driven through a belt and gear transmission by a prime mover 234. When the cam 194 is driven to its extreme left position, as viewed in FIGURE 1, the cam follower wheel 192 engages the protuberance 198 of the cam 194 such that the field member is shifted away from its center position. After the cam 194 is moved only a short distance to the right, as viewed in FIGURE 1, however, the cam follower wheel 192 returns to the under surface of the cam 194 thereby restoring the field member to its center position. The field member remains in its center position until the cam 194 has completed its travel to an extreme right position, as viewed in FIGURE 1, and returned almost to its extreme left position. As shown in FIGURE 8, the spikes 112, which project the insulating strips from the supply magazine into the field member are attached to the ram-like cam 194 by a bracket 117. Thus, as this cam approaches its extreme right position, as viewed in FIGURE 1, the spikes 112 are carried to the right to propel insulating strips from the supply magazine into the field member. As the cam 194 is returned to its extreme left position, the spikes are withdrawn fully from the supply magazine so as not to interfere with indexing of the supply magazine.

*The operating cycle*

The sequence of operation of the wedge inserting apparatus is best comprehended through an analysis of the cams 78, 80 and 116 mounted on the cam shaft 79. Referring to the cams, as illustrated in FIGURE 1, the reference point *a* on the cam 80 illustrates that portion of the cam which drives the link 84 downwardly so as to index the wedge supply magazine through 36° to a new position and also the next slots of the field member are likewise thus indexed into line to receive the wedge strips, the cam shaft 79 rotating in a clockwise direction as viewed in FIGURE 1. Reference point *b* on cam 116 indicates that portion of the cam which is effective to pivot the bell crank 111 downwardly so as to advance the ram-like cam 160 to the right as viewed in FIGURE 1 and thereby depress the coil engaging fingers 166 into engagement with the coils.

As previously noted, the ram-like cam 194 is driven from an eccentric connection on the cam shaft 79. Between the time the portion *a* on cam 80 engages the cam follower wheel 82 and the portion *b* on cam 116 engages the cam follower wheel 115 the ram-like cam 194 moves to an extreme left position as viewed in FIGURE 1 where the cam follower 192 engages the protuberance 198 of the cam 194. At this time, then, the field member is shifted from its center position. To review the preceding sequence of operations, the wedge supply means is first indexed; then, the field member is shifted to its off center position, and thereafter, the coil engaging fingers 166 are depressed downwardly a small distance to engage coils of the field member.

Immediately after the portion *b* of cam 78 engages its cam follower, the ram-like cam 194 moving to the right as viewed in FIGURE 1 moves sufficiently that the cam follower wheel 192 moves off the protuberance 193 returning the field member to its center position. As soon as the field member is in its center position, the portion *c* on cam follower wheel 116 engages the cam follower wheel 115 to further depress the fingers 166 thereby applying maximum pressure to the coils in the field member and establishing maximum clearance for the insertion of wedges over the coils.

Shortly after maximum pressure has been applied to the coils, the portion *d* of cam 80 relieves pressure on cam follower wheel 82 enabling the spring 88 to return the pawl 100 to an upward position preparatory to a new indexing operation.

As this event occurs, the ram-like cam 194 is progressing to an extreme right position as viewed in FIGURE 1 and the spikes 112, which move with this cam, are in the process of transferring insulating strips from the supply magazine into the aligned and cleared slots in the field member. During this same time interval, means not shown, responsive to movement of the cam 194, actuate the insulating strip drive rollers 34 and 36 to move new insulating strips into the top of the wedge supply magazine.

After the new insulating strips have been moved into the wedge supply magazine, the portion *e* of cam 78 engages cam follower 76 to actuate the knife 60 downwardly to cut the newly inserted insulating strip material to size.

Shortly thereafter, the portion *f* of cam 116 releases pressure on the cam follower roller 115 so as to withdraw the ram-like cam 160, thereby releasing downward pressure on the coil engaging fingers 166. This frees the field member for indexing to a new position at the start of the next cycle of operation.

In the foregoing discussion of the operating cycle, no mention was made of the pneumatic actuator 216 which determines the direction of shift of the field member away from its center position. It is to be understood that the timing of this actuator depends upon the arrangement of windings in the field member, the direction of actuation of the actuator 216 depending upon the direction the coils turn as they emerge from the slots in the field member.

Figures 9, 10:
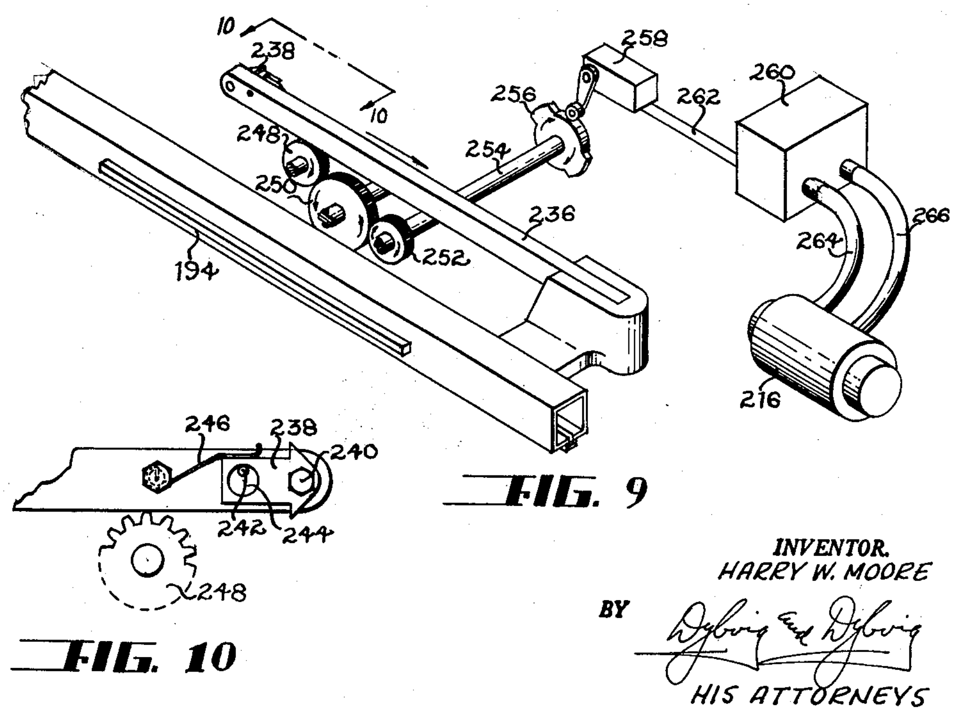
FIGURE 9 is a fragmentary perspective view illustrating mechanism responsive to operation of the present apparatus for controlling the operation of a pneumatic actuator employed in the present apparatus.
FIGURE 10 is a plan view taken in the direction of the arrows 10—10 of FIGURE 9.

Mechanism for controlling the timing of the pneumatic actuator is illustrated schematically in FIGURES 9 and 10. The ram-like cam 194 carries at its forward end a rearwardly projecting rod 236. This rod 236 supports a dog 238 which is pivotally mounted at 240. Pivotal movement of the dog 238 is restricted by a pin 242 which is mounted on the rod 236 and positioned in an enlarged aperture 244 formed in the dog 238. A spring 246 anchored to the rod 236 biases the dog 238 downwardly. As the ram-like cam 194 reciprocates, the dog 238 repeatedly passes a gear 248. During rearward movement of the cam 194, the dog passes over the gear due to the yielding action of the spring 246. On forward movement of the cam 194, however, the dog 238 engages the gear 248 and rotates this gear through a rotary angle corresponding to one tooth in the gear. By means of an idler roller 250, the rotary movement of this gear is transmitted to a gear 252, mounted on a shaft 254 carrying a cam 256.

The cam 256 operates an electric switch 258 which is connected to an electromagnetic valve 260 by means of conductors 262. The valve 260 selectively controls delivery of pneumatic pressure to the pneumatic actuator 216 through one of two conduits 264 and 266. Thus, the cam 256 selects the direction of actuation of the pneumatic actuator 216.

With the pneumatic control mechanism illustrated, it is apparent that by varying the shape of the cam 256 any desired cycle of operation for the pneumatic actuator 216 may be obtained.

*Modification*

Figure 11:
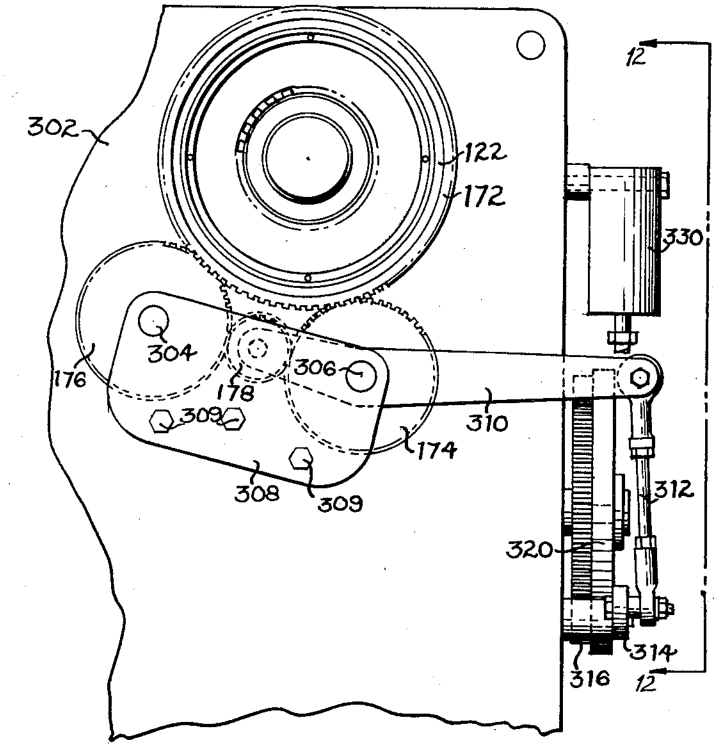
FIGURE 11 is an end elevation of a modified apparatus.
Figure 12:
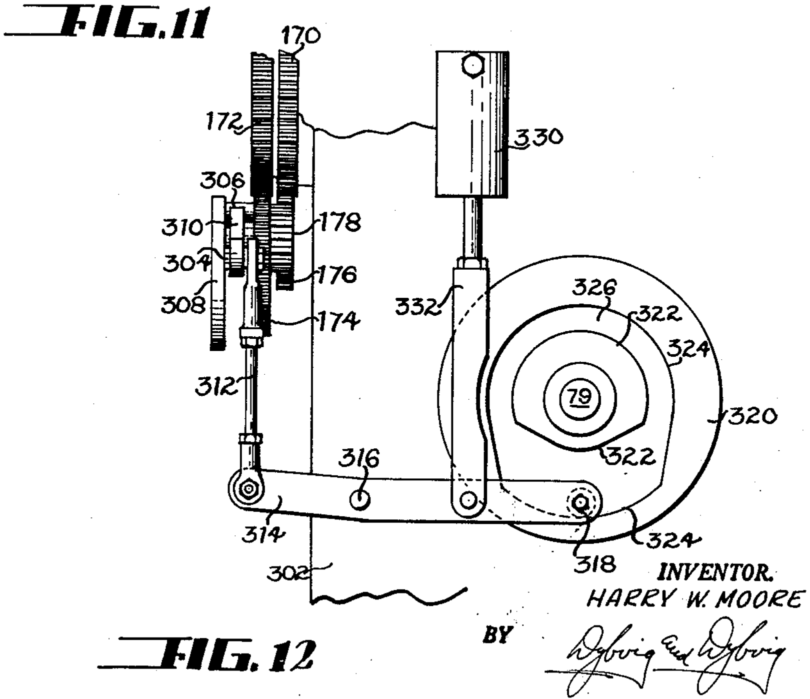
FIGURE 12 is a fragmentary side elevation view taken in the direction of the arrows 12—12 of FIGURE 11.

FIGURES 11 and 12 illustrate a modified apparatus for shifting the position of the field member to bring the coils wound therein into alignment with the fingers 166 which engage the coils. FIGURE 11 is an end elevation view illustrating the field member support 122 and surrounding ring gear 172 previously described mounted in a suitable casting 302. Not visible in this figure is the second ring gear 170 associated with the wedge supply means. This ring gear is located behind the gear 172 in FIGURE 11 and is concealed thereby; however, it can be seen in fragmentary detail in FIGURE 12. Shifting of the field member supported in the field member support 122 is accomplished by inducing a rotation of the ring gear 172 relative to the ring gear 170.

Engaging the ring gears 170 and 172 are pinions 174 and 176, respectively. These two pinions are supported in fixed relative position by shafts 304 and 306 journalled in a support bracket 308. This support bracket 308 is fixedly secured to the casting 302 with bolts 309. In FIGURE 12, these securing bolts have been omitted to avoid confusion of the details illustrated therein.

Relative rotation of the pinions 174 and 176 is produced by moving a meshing drive gear 178 transversely therebetween. For this purpose, the drive gear 178 is attached to a lever 310 pivoted on the shaft 306 for the pinion 174. The lever 310 is attached to a cam follower arm 314 by means of a linkage 312. This cam follower arm which is pivoted at 316 to a rearwardly extending portion of the casting 302 carries a cam follower roller 318 which engages a rotary cam member 320. The cam member 320 is mounted on the cam shaft 79 and rotates in unison therewith. This cam shaft is associated with the drive mechanism for the wedge supply means, previously described, and rotates once for each cycle of operation of the wedge supply means.

Recessed into the face of the cam member 320 is an annular channel 326 bounded by inner and outer wall portions 322 and 324, respectively. The channel 326 is generally concentric to the cam shaft 79 and through slightly more than one half of its length has a constant radial thickness only slightly greater than that of the cam follower roller 318. During that fraction of the operating cycle when the cam follower roller 318 is in this portion of the channel 326, the cam follower arm 314 is held in fixed central position.

During the remaining portion of the operating cycle, the channel 326 has an enlarged radial dimension such that the cam follower arm 314 can execute a pivotal movement about the central position. Control over the pivotal movement of the cam follower arm 314 in this portion of the operating cycle is effected by means of a pneumatic cylinder 330 pivotally attached to the cam follower arm 314 by means of an operating arm 332. The operation of this pneumatic cylinder is bi-directional such that the cam follower arm 314 may be biased downwardly as viewed in FIGURE 12 to cause the roller 318 to follow the curvature of the outer wall 324 or may be biased upwardly to follow the curvature of the inner wall 322 associated with the channel 326.

From the foregoing description, it will be apparent that the channel 326 in the cam member 320 locates the cam follower arm 314 in a fixed center position throughout the major portion of the operating cycle of the wedge supply means, but, during the balance of the operating cycle, permits optionally an upward or downward movement of the arm 314. An upward movement of the arm 314 away from the center position produces a downward movement of the drive gear 178 as viewed in FIGURE 11 with consequent clockwise rotation of the pinion 176 and counterclockwise rotation of the ring gear 172. Thus, the field member support 122 is shifted in the counterclockwise direction. Conversely, a downward movement of the cam follower arm 314 results in a clockwise shift of the field member support 122.

The cam member 320 and associated cam follower mechanism performs substantially the same function as the protuberance 198 formed on the ram-like cam 194, together with its associated cam follower mechanism as described in connection with the preferred embodiment. The pneumatic cylinder 330 performs substantially the same function performed by the pneumatic actuator 216 in the preferred embodiment in selecting the direction of rotary shift of the field member. Thus, the features of the present modification may be integrated into the preferred embodiment by substituting the cam member 320 and related cam follower mechanism for the cam protuberance 198 and related follower mechanism of the preferred embodiment and by substituting the pneumatic cylinder 330 and related components for the pneumatic actuator 216 and related components in the preferred embodiment.

While the foregoing description pertains to a wedge inserting device wherein two wedges are simultaneously inserted into adjacent slots of a field member, it is deemed to be within the purview of the present invention to insert only one insulating wedge into one slot of the field member in each cycle of operation. Conversely, it is deemed within the purview of the present invention to simultaneously insert more than two wedges into a field member in each cycle of operation if the arrangement of coils in the field member so permits.

Further, while the foregoing description discloses only coil engaging finger portions on one side only of the field member, it is deemed within the purview of the present invention to provide coil engaging fingers on both sides of the field member, which fingers operate simultaneously to depress and align the coils in the slots of the field member.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In an apparatus for inserting wedges into the slots of a cylindrical field member into which coils have been deposited, said coils curving circumferentially away from said slots on emerging therefrom, a wedge supply means adapted to advance a wedge axially along a predetermined path into a selected slot of said field member, means to support said field member adjacent said wedge supply means with a slot therein located in said path, said support means supporting said field member for rotation relative to said wedge supply means, coil engaging means mounted on said wedge supply means, means to rotate said field member relative to said wedge supply means to align the curved portion of a coil emerging from the selected slot in said field member with said coil engaging means, means to actuate said coil engaging means to engage the curved portion of the coil aligned therewith, and means to rotate said field member relative to said wedge supply means so as to align said selected slot in said path to receive a wedge advanced by said wedge supply means, said coil engaging means holding the curved portion of said coil stationary as said field member is rotated to align the selected slot in said path and holding said coil while a wedge is being advanced into said slot.

2. In an apparatus for inserting wedges into the slots of a cylindrical field member into which coils have been deposited, said coils curving circumferentially away from said slots on emerging therefrom, a wedge supply means adapted to advance a wedge axially along a predetermined path into a selected slot of said field member, means to support said field member adjacent said wedge supply means with a slot therein located in said path, said support means supporting said field member for rotation relative to said wedge supply means, said means supporting said field member in an initial position aligning said selected slot in said path to receive a wedge advanced by said supply means, coil engaging means mounted on said wedge supply means to engage the coil emerging from said selected slot and to depress said coil into said slot, said coil being initially misaligned with said coil engaging means due to the curvature thereof, means to rotate said field member relative to said wedge supply means away from its initial position so as to align the curved portion of said coil with said coil engaging means, means to actuate said coil engaging means into engagement with the coil aligned therewith, and means to return said field member to its initial position after said coil engaging means has engaged said coil so as to realign said selected slot in said path, said coil engaging means aligning said coil with said slot upon return of said field member to its original position and holding said coil in said slot so as to provide an opening for movement of a wedge into the slot.

3. The apparatus according to claim 2 including means to interrupt the movement of said coil engaging means in a position of partial depression of said coil into said selected slot until said field member has been returned to its initial position, and further including means to synchronize the interrupting means with the means which returns said field member to its initial position.

4. In an apparatus for inserting wedges into the slots of a cylindrical field member into which coils have been deposited, said coils curving circumferentially away from said slots on emerging therefrom, a wedge supply means adapted to advance a wedge axially along a predetermined path into a selected slot of said field member, means to support said field member adjacent said wedge supply means with a slot therein located in said path, said support means supporting said field member for rotation relative to said wedge supply means, said means supporting said field member in an initial position aligning said selected slot in said path to receive a wedge advanced by said supply means, coil engaging means mounted on said wedge supply means to engage the coil emerging from said selected slot and to support said coil in alignment with the wedge advanced by said supply means, said coil being initially misaligned with said coil engaging means due to the curvature thereof, and means to rotate said field member relative to said wedge supply means away from its initial position so as to align the curved portion of said coil with said coil engaging means, said last named means comprising a first ring gear held stationary by said wedge supply means, a second ring gear mounted on the support means for said field member and rotatable therewith, said ring gears being positioned in adjacent concentric relation with the axes of said ring gears coinciding with the axis of relative rotation between said support means and said wedge supply means, a pair of pinions, means supporting said pinions in peripherally spaced relation with one pinion meshing with each ring gear, a drive gear interposed between said pinions and meshing with each pinion, said pinions being disposed on opposite sides of said drive gear, and means to actuate said drive gear transversely between said pinions whereby said second ring gear and the pinion engaged therewith are caused to rotate, thus rotating said field member relative to said wedge supply means.

5. In an apparatus for inserting wedges into the slots of a cylindrical field member into which coils have been deposited, the combination according to claim 4 wherein the means for actuating said drive gear comprises a lever arm supporting said drive gear, a pair of hinge members engaging said arm on opposite sides of said drive gear, means to selectively support either one of said hinge members whereby said lever arm pivots selectively on either one of said hinge members, yielding means engaging one end of said lever member to bias said lever member and the drive gear carried thereby into a predetermined position, and means for actuating said lever member in opposition to said yielding means so as to actuate the drive gear carried by said lever member, the direction of actuation of said drive gear depending upon which of said hinge members is supported by the selected supporting means.

6. In an apparatus for inserting wedges into the slots of a cylindrical field member into which coils have been deposited, the combination according to the claim 4 wherein the means for actuating said drive gear comprises a lever arm supporting said drive gear, a rotary cam element having an annular channel therein bounded by spaced inner and outer surfaces, a cam follower capable of following either of said inner and outer surfaces, means to selectively bias said cam follower into engagement with either surface of said cam element, linkage means connecting said lever arm with said cam follower, and means to rotate said cam element, the construction being such that, on rotation of said cam element, said cam follower acts through the medium of said lever arm and connecting linkage to move said drive gear transversely between said pinions, the direction of such movement being dependent upon the surface of said cam element engaged by said cam follower as selected by said bias means.

7. A mechanism for producing relative rotation between two coaxially mounted relatively rotatable driven members comprising, in combination, a ring gear element secured to each of said driven members, said ring gear elements being supported by said driven members in axially spaced positions concentric to the axis of relative rotation of said driven members, a pair of pinions, means supporting said pinions in axially spaced relation for meshing engagement with said ring gear elements, said last named means also supporting said pinions in circumferentially spaced relation along the peripheries of said ring gear elements, a drive gear disposed between said pinions, said drive gear being elongated axially so as to simultaneously mesh with both of said pinions, and means to actuate said drive gear transversely between said pinions so as to cause relative rotation of said pinions with resulting relative rotation of said driven members.

8. A mechanism for selectively controlling the position of a movable member comprising a cam member supported for rotation about a fixed axis, said cam member having first and second axially extending annular wall portions encircling said axis and disposed in radially spaced opposing relation, a cam follower element interposed between said cam surfaces, linkage means connecting said cam follower element to said movable member whereby the position of said cam follower element determines the position of said movable member, means to selectively bias said cam follower against one or the other of said cam surfaces, and means to rotate said cam member about said axis whereby said cam follower element positions said movable member in accordance with the shape of the cam surface engaged thereby.

9. The mechanism according to claim 8 wherein said cam follower element comprises a wheel adapted to roll on either of said cam surfaces and wherein said cam surfaces throughout a portion of their length are concentric to said axis and spaced apart radially a distance substantially equal to the diameter of said wheel whereby said cam surfaces cooperate to support said cam follower element and the movable member linked thereto in a fixed position throughout such portion of their length, said cam surfaces diverging one away from the other in the remaining portion of their length to enable movement of said movable member in either of two directions away from said fixed position dependent upon the direction of bias supplied by said bias means.

References Cited by the Examiner

UNITED STATES PATENTS

| | | | |
|---|---|---|---|
| 1,224,518 | 5/17 | Apple | 29—155.53 |
| 1,555,931 | 10/25 | Apple | 29—155.53 |
| 2,192,801 | 3/40 | Poole | 29—205 |
| 2,272,263 | 2/42 | Cullin | 29—205 |
| 2,506,173 | 5/50 | Polard | 29—205 |
| 2,685,730 | 8/54 | Probst | 29—205 |

WHITMORE A. WILTZ, *Primary Examiner.*

THOMAS H. EAGER, *Examiner.*